United States Patent [19]

Kondo et al.

[11] Patent Number: 4,732,616

[45] Date of Patent: Mar. 22, 1988

[54] LITHOGRAPHIC INK ADDITIVES

[75] Inventors: Toshiro Kondo; Eiji Kanada, both of Nagaokakyo, Japan

[73] Assignee: Mitsubishi Paper Mills, Ltd., Tokyo, Japan

[21] Appl. No.: 804,469

[22] Filed: Dec. 4, 1985

[30] Foreign Application Priority Data

Dec. 11, 1984 [JP] Japan .................. 59-261089
Dec. 11, 1984 [JP] Japan .................. 59-261090

[51] Int. Cl.$^4$ .................. C09D 11/00; C09D 11/08
[52] U.S. Cl. .................. 106/23; 106/20; 106/22; 106/30; 106/32
[58] Field of Search .................. 106/20, 30, 32, 22, 106/23

[56] References Cited

U.S. PATENT DOCUMENTS

| | | | |
|---|---|---|---|
| 4,304,601 | 12/1981 | Sharp | .106/30 |
| 4,357,164 | 11/1982 | Tsuye et al. | 106/30 |
| 4,400,216 | 8/1983 | Arora et al. | 106/30 |
| 4,589,920 | 5/1986 | Kanada et al. | 106/30 |
| 4,652,486 | 3/1987 | Tasaka et al. | 106/20 |

*Primary Examiner*—Josephine Barr
*Attorney, Agent, or Firm*—Cushman, Darby & Cushman

[57] ABSTRACT

Disclosed is an additive for lithographic printing ink improved in flow, drying and interfacial properties. This additive contains a compound having an alkylene oxide unit and of a HLB value of 3 to 13. Further improvement can be attained by the use of additive which contains a combination of at least one compound having an alkylene oxide unit and a hydrocarbon radical of 1 to 8 carbon atoms and at least one compound having an alkylene oxide unit and a hydrocarbon radical of 9 or more carbon atoms, the average HLB value of said combination being 3 to 13.

14 Claims, No Drawings

LITHOGRAPHIC INK ADDITIVES

BACKGROUND OF THE INVENTION

This invention relates to lithographic ink additives.

The printing surface of a lithographic printing plate consists of oleophilic image areas receptive to a greasy ink and lipophobic non-image areas unreceptive to said ink. The non-image areas are a generally hydrophilic surface receptive to water. Accordingly, the common lithographic printing is performed by feeding both an ink and water to the printing surface so that the image areas receive preferentially the coloring ink and the non-image areas preferentially receive the water, and transferring the ink in image areas to a substrate such as, for example, paper. As the lithographic printing plates using a dampening solution, there are known a presensitized plate utilizing diazonium compounds, a printing plate of the electrophotographic type employing zinc oxide or an organic photoconductor, and a printing plate of the silver salt photographic type using a silver halide emulsion as photosensitive component.

For use in various lithographic printing plates, there are also known a large variety of printing inks. Although conventional lithographic inks are capable of producing good prints in the cases where a specific printing plate or a specific dampening solution is used, yet they reveal various disadvantages under other printing conditions such as variation in the type of printing plate or dampening solution and even become unsuitable for practical use. The requisite properties for the lithographic inks include sufficient adherence to the image areas, perfect non-adherence to the non-image areas, and, in addition to these obviously fundamental properties, suitable levels of those properties which relate to flow, interfacial behavior, and drying. Especially in lithographic printing, the greasy ink is required to maintain an adequate balance between the ink-water interfacial tension and the surface tensions of both phases, because otherwise there will occur gradual enlargement or, conversely, disappearance of the image areas, emulsification of the ink, and a phenomenon of scumming during the printing of thousands of tens of thousands of copies with alternate feeding of a greasy ink and water, which is repeated for each copy. Therefore, printing inks of excellent interfacial behavior are required in lithography. Conventional lithographic inks, which are hardly said to have satisfactory interfacial behavior, tend to cause the above-mentioned disadvantages and are insufficient in the adaptability to variation in the plate material and dampening solution. Particularly, most color inks, excepting a black ink, used in color printing contain comparatively hydrophilic pigments, as contrasted with carbon black, and are liable to emulsification during printing, resulting in severe scumming which interferes with satisfactory tone reproduction and makes the prints useless.

SUMMARY OF THE INVENTION

The primary object of this invention is to provide an additive for obtaining a lithographic printing ink improved in flow, drying, and interfacial properties.

DESCRIPTION OF THE INVENTION

The primary object of this invention can be achieved by an ink additive to be added to the vehicle of a lithographic printing ink, comprising a compound having an alkylene oxide unit and of a HLB value of 3 to 13. The additive is further improved when there is used a combination of at least one compound having an alkylene oxide unit and a hydrocarbon radical of 1 to 8 carbon atoms and at least one compound having an alkylene oxide unit and a hydrocarbon radical of 9 or more carbon atoms, said combination having an average HLB value of 3 to 13.

The additive of this invention can be added to either a commercial lithographic ink or a vehicle used in preparing a lithographic ink. In a preferred embodiment of this invention, the additive is made into a mixture of the said compound and a resin (vehicle) compatible with the vehicle of a lithographic ink (generally a commercial one) containing at least major components, that is, a pigment and a vehicle, and the mixture is added to the ink. The advantages of such a mixture over the compound alone are in that the mixture can minimize the change in fluidity and drying of the ink and the mixture can also be added on a printing press. A further advantage of the mixture is in that a suitable vehicle can be selected from a large variety of resins so that the mixture may have a fluidity higher than that of the ink in order to facilitate the mixing with a commercial lithographic ink having a high viscosity.

The compound used in the ink additive of this invention is represented by the following general formula and has a HLB value of 3 to 13, preferably 5 to 12:

$$R\text{-}(A)_m\text{OH}$$

wherein R represents a substituted or unsubstituted aliphatic or aromatic hydrocarbon radical, A represents an alkylene oxide group, and m is an integer of 1 or above.

According to this invention, it is further preferable to use the above compounds in the form of combination of at least two compounds, one selected from group A having a hydrocarbon radical (R, e.g. alkyl or aryl) of 1 to 8 carbon atoms and the other selected from group B having a hydrocarbon radical (R, e.g. alkyl or aryl) of 9 or more carbon atoms, the HLB value of groups A and B being 1 to 15 and the average HLB value of the combination being 3 to 13, preferably 5 to 12. The HLB (Hydrophile Lipophile Balance) value as herein referred to is a value obtained by dividing the weight percent of alkylene oxide group in the molecule of the above compound by 5.

Typical examples of the compounds used in the additives of this invention are shown below.

| Compound No. | R | A | m |
| --- | --- | --- | --- |
| 1 | $C_9H_{19}\text{-}\langle\text{phenyl}\rangle\text{-}$ | $-OCH_2CH_2-$ | 2 |
| 2 | " | " | 3 |
| 3 | " | " | 4 |
| 4 | " | " | 5 |
| 5 | " | " | 6 |
| 6 | $C_8H_{17}\text{-}\langle\text{phenyl}\rangle\text{-}$ | " | 4 |
| 7 | $H_5C_2-$ | " | 1 |

-continued

| Compound No. | R | A | m |
| --- | --- | --- | --- |
| 8 | $H_9C_4-$ | " | 1 |
| 9 | " | " | 2 |
| 10 | $H_7C_3-$ | $-OCH_2CH(CH_3)-$ | 1 |
| 11 | $C_{12}H_{25}-C_6H_4-$ | $-OCH_2CH_2-$ | 5 |
| 12 | $C_6H_5-$ | $-OCH_2CH(OH)CH_2-$ | 1 |
| 13 | $H_9C_4-$ | $-OCH_2CH(CH_3)-$ | 1 |
| 14 | $C_6H_5-$ | " | 1 |
| 15 | " | " | 2 |

Group A
 A-1 Ethylene glycol monomethyl ether
 A-2 Ethylene glycol monoethyl ether
 A-3 Ethylene glycol monobutyl ether
 A-4 Diethylene glycol monomethyl ether
 A-5 Diethylene glycol monoethyl ether
 A-6 Diethylene glycol monobutyl ether
 A-7 Diethylene glycol monophenyl ether
 A-8 Propylene glycol monobutyl ether Group B
 B-1 Ethylene glycol mono-p-nonylphenyl ether
 B-2 Diethylene glycol mono-p-nonylphenyl ether
 B-3 Triethylene glycol mono-p-nonylphenyl ether
 B-4 Tetraethylene glycol mono-p-nonylphenyl ether
 B-5 Pentaethylene glycol mono-p-nonylphenyl ether
 B-6 Heptaethylene glycol mono-p-nonylphenyl ether
 B-7 Octaethylene glycol mono-p-nonylphenyl ether
 B-8 Triethylene glycol monododecyl ether
 B-9 Tetraethylene glycol mono-p-octylphenyl ether
 B-10 Pentaethylene glycol mono-p-dodecylphenyl ether In using a combination of compounds of group A and group B, it is desirable to select the compounds different in number of carbon atoms by 3 or more, preferably 5 or more. The ratio of A to B in the combination varies in accordance with the intended characteristics of the ink, but is generally in the range of from 1:5 to 5:1 (molar ratio). If necessary, ink solvents such as "Nisseki" No. 0, 5, or 6 can be used.

As described previously, the above compounds in the present additive are preferably in the form of milled mixture with common vehicles for lithographic inks, including drying oils, synthetic drying oils, natural or processed resins such as rosin, copal, dammar, shellac, hardened rosin, and rosin esters; phenolic resins, rosin-modified phenolic resins, 100% phenolic resins, maleic acid resins, alkyd resins, petroleum resins, vinyl resins, acrylic resins, polyamide resins, epoxy resins, aminoalkyd resins, polyurethane resins, and aminoplasts.

The ratio of the compound to the vehicle in the ink can be optionally selected, but is generally in the range of from 1:0.5 to 1:5 (weight ratio). The ratio of the compound to the lithographic ink varies according to the type of ink and plate material, but a general standard is in the range of from about 1 to about 10% by weight.

The ink additives of this invention may contain various other additives generally used in lithographic printing inks such as, for example, plasticizers, stabilizers, driers, thickners, dispersants, and fillers. The ink additives of this invention can be applied to all types of the lithographic plates and lithographic inks used in the offset printing employing a dampening solution.

A wide variety of dampening solutions can be used together with the printing inks containing the additives of this invention. There are used not only plain water but also water modified in performance characteristics by the addition of known substances such as desensitization accelerators, buffers, preservatives, and wetting agents. Examples of such substances are gum arabic, carboxymethylcellulose, sodium alginate, polyvinyl pyrrolidone, polyvinyl-imidazole, polyvinyl methyl ether-maleic anhydride copolymers, carboxymethyl-starch, ammonium alginate, oxidized ammonium alginate, methylcellulose, sulfates (e.g. sodium sulfate and ammonium sulfate), phosphoric acid, nitric acid, nitrous acid, tannic acid and salts thereof, polyol compounds (polyethylene glycols, ethylene glycol, propylene glycol, glycerol, diethylene glycol, hexylene glycol), organic weak aids (citric acid, succinic acid, tartaric acid, adipic acid, ascorbic acid, propionic acid), polyacrylic acid, ammonium bichromate, chrome alumn, alginic ester of propylene glycol, aminopolycarboxylate (e.g. ethylenediaminetetraacetic acid sodium salt), inorganic colloids (e.g. colloidal silica), and surface active agents. These compounds are used each alone or in mixtures. In addition to the above compounds, there can be used water-miscible organic solvents such as methanol, dimethylformamide, and dioxane; a small amount of colorants such as phthalocyanine dyes, malachite green, and ultramarines.

The invention is illustrated in detail below, but the invention is not limited thereto.

EXAMPLE 1

On one side of a two-side polyethylene coated paper, 135 g/m² in basis weight, there was provided a matting layer containing powdered silica having an average particle size of 5μ. On the opposite side which had been subjected to corona discharge treatment, there was provided an antihalation layer containing carbon black, 0.2 g/m² of 1-phenyl-3-pyrazolidone, and 3.5 g/m² of gelatin. The antihalation layer was overcoated with a high-speed orthochromatic silver chloride emulsion containing powdered silica of 7μ in average particle size, 0.1 g/m² of 1-phenyl-8-pyrazolidone, and 1.0 g/m² of gelatin, the silver chloride coverage being 1.2 g/m² in terms of silver nitrate. The antihalation and emulsion layers contained formaldehyde as hardener. After drying, the resulting material was heated to 40° C. for 10 days and the emulsion layer was overcoated with a palladium sulfide sol prepared in the following manner.

Preparation of palladium sulfide sol:
Solution A
 Palladium chloride: 5 g
 Hydrochloric acid: 40 ml
 Water: 1 liter Solution B
  Sodium sulfide: 8.6 g
  Water: 1 liter
Solutions A and B were mixed with stirring and, after 80 minutes, the mixture was purified by passing through a column of ion-exchange resin for water purification. The effluent was mixed with solution C to prepare the palladium sulfide sol for coating (adjusted to pH 4).
Solution C
  Polyvinyl alcohol (10% solution): 10 g
  Polymer No. 3 described in Japanese Patent Application "Kokai" (Laid-open) No. 21,602/78: 3 g
  Hydroquinone: 800 g
  10% Aqueous saponin solution: 20 ml
  Water: 18 liters The photosensitive element for lithographic printing plate thus obtained was imagewise exposed in a letterpress process camera provided with an image reversal mechanism. The exposed element was developed with the following silver complex diffusion transfer developer at 30° C. for 1 minute.
Transfer developer
  Water: 750 ml
  Potassium hydroxide: 20 g
  Sodium sulfite, anhydrous: 60 g
  Potassium bromide: 0.5 g
  2-Mercaptobenzoic acid: 1 g
  3-Mercapto-4-acetamido-5-n-heptyl-1,2,4-triazole: 0.15 g
  2-Methyl-2-amino-1-propanol: 10 g
  Made up with water to: 1 liter After the development, the photographic element was passed through a pair of squeeze rolls to remove the excess developer and immediately treated with a neutralizer of the following composition at 25° C. for 20 seconds. After removal of the excess solution by passing through the squeeze rolls, the element was dried at room temperature.
Neutralizer
  Water: 600 ml
  Ethylene glycol: 5 ml
  Citric acid: 10 g
  Sodium citrate: 35 g
  Made up with water to: 1 liter The lithographic printing plate prepared as described above was mounted on an offset press and fed all over the surface with the following desensitizing solution. Using the following dampening solution the press was set in operation.
Desensitizing solution
  Water: 600 ml
  Isopropyl alcohol: 400 ml
  Ethylene glycol: 50 ml
  3-Mercapto-4-acetamido-5-n-heptyl-1,2,4-triazole: 1 g
Dampening solution (running solution)
  Orthophosphoric acid: 10 g
  Nickel nitrate: 5 g
  Sodium nitrite: 5 g
  Ethylene glycol: 100 ml
  Made up with water to: 20 liters An offset printing press "A. B. Dick 350 CD" (Trademark for A. B. Dick Co.) was used in the printing test. The ink additives were evaluated in terms of number of copies obtained before appreciable scumming had taken place. The marking was based on the following criteria:

| Mark | Number of acceptable copies |
|---|---|
| X | <500 |
| Δ | 500–1,000 |
| ○ | 1,000–5,000 |
| ⊙ | >5,000 |

Printing inks were prepared by incorporating each about 3% by weight of the following additives into "F Gloss Purple" (Dainippon Ink and Chemicals Co.) used as base ink.

Ink additives A to G

The ink additives A to G were prepared by incorporating, on an ink mill, 100 parts by weight of Compound No. 1, 2, 3, 4, 5, 8, or 13 into 100 parts by weight of a rosin-modified phenolic resin.

The results of printing test were as shown in Table 1.

TABLE 1

| Ink additive | Evaluation mark |
|---|---|
| None (blank test) | X |
| A | ⊙ |
| B | ⊙ |
| C | ⊙ |
| D | ⊙ |
| E | ⊙ |
| F | ⊙ |
| G | ⊙ |

When the inks containing the additives A to G according to this invention were used, more than 5,000 high-quality copies with high image density were obtained without any scumming.

For reference, printing test was carried out by using a dampening solution of the aforementioned composition but containing 5 g/liter of added compound No. 3 or No. 9, and "F Gloss Purple" as printing ink. The results of evaluation were X.

For comparison, an ink additive was prepared in a manner similar to that in Example 1 but using diethylene glycol monomethyl ether. The results of evaluation were X.

EXAMPLE 2

To 100 parts by weight of a silicone-modified alkyd resin, was added 50 parts by weight of compound No. 3 or No. 9. The resulting mixture was thoroughly milled to prepare two ink additives. In the blank test, the above alkyd resin was used alone. Tests were carried out as in Example 1. The result of evaluation was Δ for the blank test and ⊙ for the additives of this invention.

EXAMPLE 3

To three commercial ink compositions for color printing, each different from one another in tack and color, were added each 10% by weight of the ink additives D and F of this invention, respectively. The resulting inks, which had been thoroughly milled, and the commercial ink compositions without the additives of this invention were tested. The results were similar to those obtained in Example 1.

EXAMPLE 4

Printing test similar to that in Example 1 was repeated using a lithographic printing plate prepared from a commercial presensitized plate and that made by using zinc oxide, the dampening solutions being specific to respective plates. The results were similar to those obtained in Example 1.

EXAMPLE 5

The printing test on the presensitized plate in Example 4 was repeated, except that an UV ink ("FDO" of Toyo Ink Mfg. Co.) admixed with 3% of the additives in Example 1 was used and the printing was performed by means of a high speed web offset printing press. Prints of high image density were steadily obtained.

EXAMPLE 6

The photosensitive material ("Silver Master" of Mitsubishi Paper Mills, Ltd.) which utilizes silver complex diffusion transfer process was imagewise exposed and processed to make a printing plate. The plate was mounted on an offset press and set in operation using the desensitizing solution and dampening solution which are specifically used for Silver Master. Printing inks were prepared by adding each 5% by weight of the following ink additives H to L to a base ink, "F Gloss Purple A" (Dainippon Ink and Chemicals Co.), and milling thoroughly.

Ink additives H to L

Ink additives H to L were prepared by adding the compounds shown in the following table to 100 parts by weight of a rosin-modified alkylphenol resin and milling thoroughly. In the following table 2, figures in parentheses are parts by weight.

TABLE 2

| Ink additive | Compound | |
|---|---|---|
| | Group A | Group B |
| H | 2 (100) | — |
| I | 5 (100) | — |
| J | — | 6 (100) |
| K | 2 (50) | 6 (50) |
| L | 5 (50) | 6 (50) |

Printing was carried out by means of an offset press and evaluated according to the following criteria in terms of number of copies obtained before scumming had become appreciable.

| Mark | Number of acceptable copies |
|---|---|
| X | <1,000 |
| ○ | <5,000 |
| ⊚ | >10,000 |

The results of evaluation were as shown in Table 3.

TABLE 3

| Ink additive | Mark | Remark |
|---|---|---|
| None (blank test) | X | |
| H | ○ | |
| I | ○ | |
| J | ○ | Ink emulsified |
| K | ⊚ | |
| L | ⊚ | |

As compared with the inks containing the additives K and L, those containing the additives H and I were difficult to handle owing to a low viscosity, tend to flow on the ink roll, and quick drying. Such properties give rise to a problem concerning the stability on the press. The inks containing the additives K and L were easily absorbable and excellent in the stability on the press. These inks showed no scumming even after 10,000 copies had been printed and the print was of high image density, the reproduction of continuous tone being excellent.

EXAMPLE 7

Ink additives were prepared by adding the compounds shown in the following table 4 each to 100 parts by weight of a silicone-modified alkyd resin. The printing test was performed in the same manner as in Example 6. It was confirmed that the results were similar to those obtained with the additives K and L in Example 6.

TABLE 4

| Ink additive | Compound No. | |
|---|---|---|
| | Group A | Group B |
| 1 | 3 (25) | 4 (25) |
| 2 | 6 (25) | 5 (25) |
| 3 | 6 (20) | 1 (10), 5 (20) |
| 4 | 7 (25) | 3 (25) |
| 5 | 4 (25) | 2 (25) |
| 6 | 1 (10), 6 (20) | 5 (20) |
| 7 | 5 (25) | 6 (25) |

EXAMPLE 8

To three commercial ink compositions for color printing, each different from one another in tack and color, were added respectively 3% by weight of the ink additives K and L of this invention used in Example 6. The results of printing test were similar to those obtained in Example 6.

EXAMPLE 9

Printing tests similar to those in Examples 6 and 7 were repeated using a lithographic printing plate prepared from a commercial presensitized plate and that made by using zinc oxide, the dampening solutions being specific to respective plates. The results obtained were similar to those obtained in Example 6.

What is claimed is:

1. A lithographic printing ink which contains as an ink additive a compound having an alkylene oxide unit and an HLB value of 3 to 13, said compound having the formula

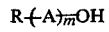

wherein R represents an unsubstituted aliphatic or aromatic hydrocarbon radical, A represents an alkylene oxide group, and m is an integer of 1 or above.

2. A lithographic printing ink according to claim 1 where m is an integer from 1 to 8.

3. A lithographic printing in according to claim 2 also including a pigment and a vehicle.

4. A lithographic printing ink according to claim 1 also including a pigment and a vehicle.

5. A lithographic printing ink according to claim 1, wherein the amount of said compound in the lithographic ink is in the range of from about 1 to about 10% by weight.

6. A lithographic printing ink which contains as an ink additive a combination of (1) at least one compound having the formula R$-$(A)$_m$OH wherein R represents an aliphatic or aromatic hydrocarbon radical of 1 to 8 carbon atoms, A represents an alkylene oxide group and m is an integer of 1 or above and (2) at least one compound having the formula $R_1—A)_mOH$ where $R_1$ represents an aliphatic or aromatic hydrocarbon radical of 9 or more carbon atoms, A represents an alkylene oxide group and m is an integer of 1 or above, the molar ratio of the compound having a hydrocarbon radical of 1 to 8 carbon atoms to the compound having a hydrocarbon radical of 9 or more carbon atoms is in the range of from 1:5 to 5:1, the average HLB value of said combination being 3 to 13.

7. A lithographic ink additive according to claim 6 wherein in compound (2) $R_1$ has 9 to 18 carbon atoms.

8. A lithographic printing ink according to claim 6, wherein the amount of said combination in the lithographic ink is in the range of from about 1 to about 10% by weight.

9. A lithographic printing ink according to claim 6 also including a pigment and a vehicle.

10. In a process of lithographic printing the improvement comprising employing the printing ink of claim 6.

11. In a process of lithographic printing the improvement comprising employing the printing ink of claim 1.

12. A lithographic printing ink according to claim 1 wherein the upper limit on R is 18 carbon atoms.

13. A lithographic printing process according to claim 10, wherein the compound is incorporated into a lithographic printing ink at the time of printing.

14. A lithographic printing process according to claim 11, wherein the compounds are incorporated into a lithographic printing ink at the time of printing.

* * * * *